United States Patent [19]

Tooyama et al.

[11] 4,280,134
[45] Jul. 21, 1981

[54] BEAM INDEX COLOR TELEVISION RECEIVER APPARATUS

[75] Inventors: Akira Tooyama, Tokyo; Takashi Tooyama, Kokubunji; Takashi Hosono, Yokohama, all of Japan

[73] Assignee: Sony Corporation, Tokyo, Japan

[21] Appl. No.: 54,490

[22] Filed: Jul. 3, 1979

[30] Foreign Application Priority Data

Jul. 5, 1978 [JP] Japan .................................. 53-81787

[51] Int. Cl.³ ............................................. H04N 9/24
[52] U.S. Cl. ..................................................... 358/67
[58] Field of Search ...................... 358/66, 67, 68, 69, 358/70

[56] References Cited

U.S. PATENT DOCUMENTS 2,887,528   5/1959   Rhodes .............................. 358/67 X

FOREIGN PATENT DOCUMENTS 1366277   9/1974   United Kingdom .
1376220  12/1974   United Kingdom .

Primary Examiner—Robert L. Richardson
Attorney, Agent, or Firm—Lewis H. Eslinger; Alvin Sinderbrand

[57] ABSTRACT

Apparatus for controlling the electron beam in a beam index color television receiver of the type having a cathode ray tube whose display screen is provided with beam-excitable color elements and index elements which are scanned by the beam. The apparatus comprises an index signal generator for generating a periodic index signal as the index elements are scanned by the beam. Color gates are provided for sequentially gating respective color control signals individually to modulate the electron beam as that beam scans the color elements. A gating signal generator generates sequential gating signals at a frequency synchronized with the frequency of the periodic index signal. These gating signals are supplied in sequence to the color gates to control the latter so as to gate the respective color control signals. A driving circuit responds to the periodic index signal to drive the gating signal generator. The driving circuit includes a time adjustment circuit for compensating the inherent time delay of the overall apparatus such that the respective color control signals are gated in time correspondence with the position of the beam at a color element that is associated with the gated color control signal.

11 Claims, 21 Drawing Figures

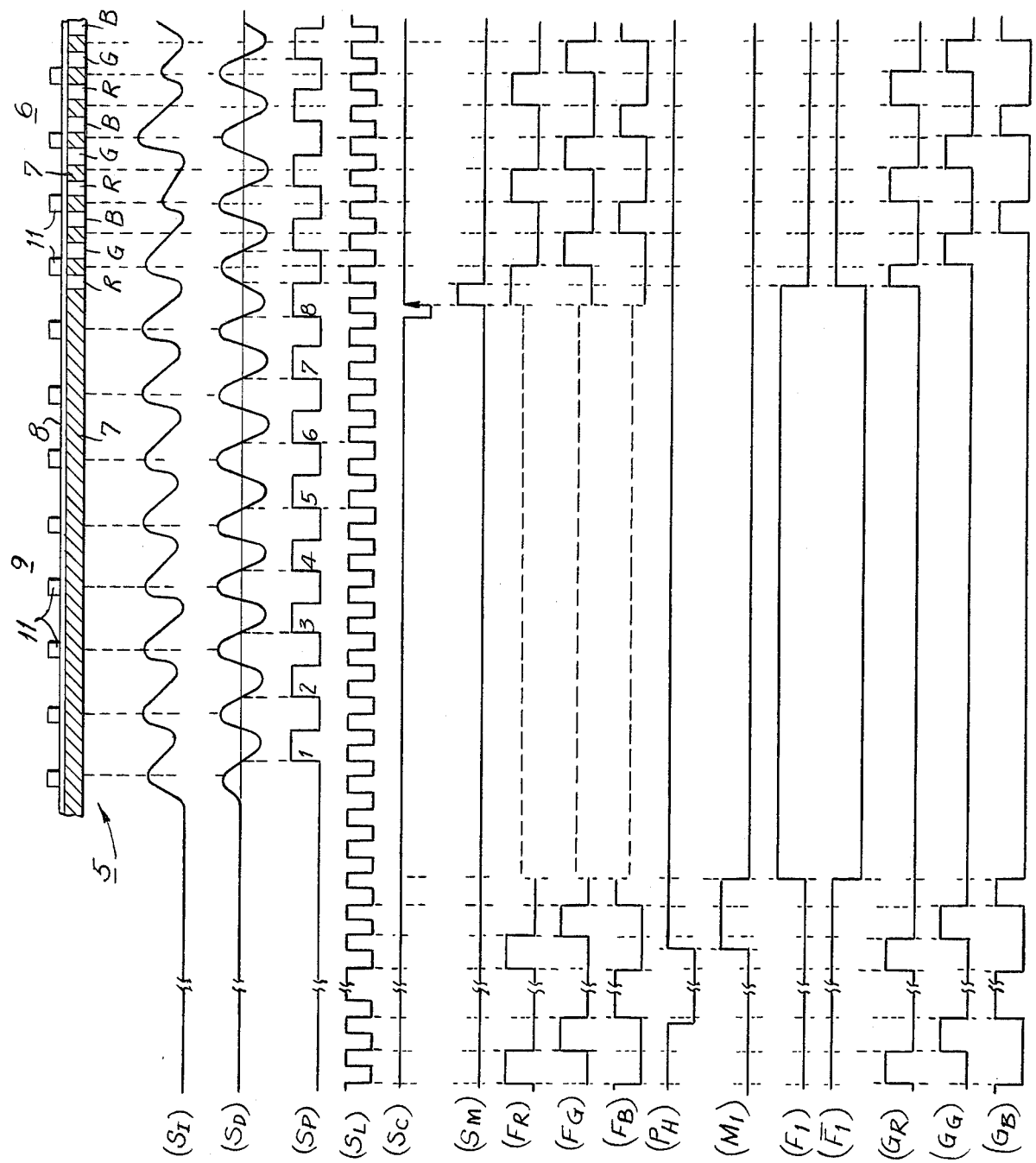

BEAM INDEX COLOR TELEVISION RECEIVER APPARATUS

BACKGROUND OF THE INVENTION

This invention relates to apparatus for controlling the electron beam in a beam index color television receiver and, more particularly, to such apparatus wherein inherent time delays therein are compensated such that as the beam moves to a particular color element on the display screen of the cathode ray tube, the beam is modulated with a color control signal that is associated with that color element.

Beam index color television receivers are known wherein the display screen of the cathode tube in that receiver is provided, in addition to the usual beam-excitable color elements, such as red (R), green (G) and blue (B) phosphor stripes, with periodic index stripes. The phosphor stripes, as is conventional, are arrayed in RGB triads, repetitively across the display screen so as to be scanned by the electron beam as the latter effects a horizontal line scan in, for example, left-to-right traverse. As the electron beam scans the color phosphor stripes, it also scans the index stripes which, typically, also are phosphor stripes so as to emit light when excited by the scanning electron beam. In order to prevent light from the scanned index stripes from interfering with the displayed television picture, the index stripes are disposed on one surface of a thin metal layer and the color phosphor stripes are disposed on the opposite surface of this thin metal layer, which layer is substantially transparent to the scanning electron beam but blocks the light which is emitted by the phosphor index stripes. A photo-detector responds to each excited phosphor index stripe to produce a periodic signal whose frequency is equal to the frequency at which the phosphor index stripes are excited. Thus, as the electron beam scans a horizontal line across the display screen, the photo-detector generates a periodic index signal.

Examples of beam index color television receivers are disclosed in copending Applications Ser. Nos. 969,861, filed Dec. 15, 1978; 969,975, filed Dec. 15, 1978; and 972,236, filed Dec. 22, 1978, all assigned to the assignee of the instant invention.

The index signal which is derived from the scanning of the aforementioned phosphor index stripes is used to gate red, green and blue color control signals onto, for example, the first grid of the cathode ray tube in successive time sequence. Since the index signal is derived from the scanning of the electron beam, the index signal is related to the scanning velocity of that beam. Thus, the gating of the respective color control signals, referred to as color switching, desirably is synchronized with the beam velocity. This means that when the beam moves into scanning alignment with, for example, a red phosphor element, the red control signal is gated so as to modulate the beam with red signal information. Then, as the beam moves into proper scanning alignment with the green phosphor element, the red control signal is interrupted and the green control signal is gated so as to modulate the beam. Similarly, when the beam next moves into proper scanning alignment with a blue phosphor element, the green control signal is interrupted and the blue control signal is gated to modulate the beam. The foregoing gating sequence is repeated so that, as the beam scans the red, green and blue phosphor elements, it is concurrently and synchronizingly modulated with the red, green and blue color information.

In a beam index color television receiver of the type described in the above-mentioned copending applications, red, green and blue gates are provided for the red, green and blue color information signals, respectively, and each of these red, green and blue gates is opened individually and in sequence as the beam scans a horizontal line. A phase-locked loop is provided to synchronize the gating signals, that is, the signals which are used to open the red, green and blue gates sequentially, with the index signal. Thus, if the index signal undergoes a change in frequency due to, for example, a change in the scanning velocity of the beam, the red, green and blue gates nevertheless will be opened at the proper time, that is, at the times that the beam moves into proper scanning alignment with the red, green and blue phosphor elements, respectively. However, the phase-locked loop suffers from an inherent time delay. That is, when the output of the phase-locked loop is "locked" to the index signal, there actually may be a small time difference between these signals. Also, the output of the phase-locked loop cannot follow instantaneously all changes in the index signal because of the inherent time delay. Furthermore, the circuitry that is used to produce the red, green and blue gating signals, as well as the red, green and blue gates themselves, exhibit an inherent time delay. The overall time delay of the color switching control circuitry is known as a static delay, and can effect errors in the color switching sychronization. That is, and with reference to, for example, the red gate, this gate should open to gate the red control, or color information, signal when the beam moves into proper scanning alignment with a red phosphor element. Unfortunately, because of the aforementioned inherent static delay of the color switching control circuitry, the red gate might open at a slightly delayed time. This means that the beam already may be advanced with respect to the proper scanning alignment thereof relative to the red phosphor element at the time that the red gate opens. This red gate might remain open for a brief period of time when the beam then moves into scanning alignment with an adjacent green phosphor element. Thus, erroneous color synchronization may occur.

OBJECTS OF THE INVENTION

Therefore, it is an object of the present invention to provide improved apparatus for controlling the electron beam in a beam index color television receiver which overcomes the aforenoted disadvantages.

Another object of this invention is to provide an apparatus for controlling the electron beam in a beam index color television receiver wherein color switching of the beam is synchronized accurately with an index signal, and wherein color switching errors are substantially eliminated.

A further object of this invention is to provide an apparatus for controlling the electron beam in a beam index color television receiver wherein the static time delay inherent in the overall color switching circuitry of such apparatus is compensated so as to improve the synchronization between the color switching and the index signal, and thus synchronize the color switching with the actual scanning movement of the beam.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for controlling the electron beam in a beam index color television receiver of the type having a cathode ray tube whose display screen is provided with beam-excitable color elements and with index elements which are scanned by the beam. An index signal generator generates a periodic index signal as the index elements are scanned by the beam. A color gate circuit is used to switch the respective color control, or information, signals individually and sequentially to modulate the electron beam as the beam scans the color elements. A gating signal generator generates sequential gating signals at a frequency synchronized with the frequency of the periodic index signal. These gating signals are supplied in sequence to the color gate circuit to control the latter so as to gate, or switch, the respective color control, or information, signals. A driving circuit responds to the periodic index signal to drive the gating signal generator. The driving circuit includes a time adjustment circuit for compensating the inherent time delay of the overall apparatus such that the respective color control, or information, signals are gated, or switched, in time correspondence to the position of the beam at a color element that is associated with the gated color control, or information, signal. Thus, the aforementioned inherent static time delay of the apparatus is compensated so that when the beam moves into proper scanning alignment with, for example, a red color element, a red control, or information, signal is switched to modulate the beam.

BRIEF DESCRIPTION OF THE DRAWINGS

The following detailed description, given by way of example, will best be understood in conjunction with the accompanying drawings in which:

FIGS. 6A–6P are waveform diagrams which are useful in understanding the operation of the embodiment shown in FIG. 4.

DETAILED DESCRIPTION OF A PREFERRED EMBODIMENT

Figure 1:
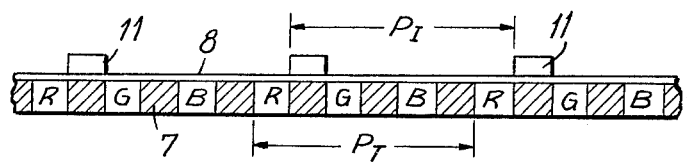
FIG. 1 is a representation of a top view of a portion of the display screen of a cathode ray tube used in a beam index color television receiver.

Referring now to the drawings, FIG. 1 is a representation of a top view of a portion of the display screen which can be used in the cathode ray tube of a beam index color television receiver of the type with which the present invention finds ready application. Triads of red, green and blue (RGB) phosphor elements are provided on the display screen. As is known, each phosphor element emits light when excited by a scanning electron beam, the intensity of the light emitted thereby being determined by the intensity of the impinging beam. The triads exhibit a pitch $P_T$ and repeat in the scanning direction of the beam, i.e., RGBRGBRGB . . . Adjacent color phosphor elements are separated by a black material 7 formed of, for example, carbon or the like. This layer of black material 7 and the color phosphor elements are provided on one surface of a metal black layer 8 constructed of, for example, aluminum or the like. Metal layer 8 functions as a light reflecting layer so as to reflect light which is emitted from the excited phosphor elements RGB, RGB, etc. This metal layer, however, is substantially "transparent" to the scanning electron beam which passes therethrough to excite each of the color phosphor elements.

On the other surface of metal layer 8 is provided a periodic array of phosphor index elements 11. These elements, which may be formed as periodic vertical stripes, are excited by the scanning electron beam to emit light. In FIG. 1, the pitch $P_I$ of index elements 11 is equal to the pitch $P_T$ of the triads of color phosphor elements.

As the electron beam (not shown) scans the display screen shown in FIG. 1, index elements 11 are excited to emit light, but this light cannot pass through reflected metal layer 8 and, therefore, does not interfere with the color television picture which is produced by exciting the color phosphor elements as the beam scans successive horizontal lines. Thus, a viewer perceives a color video picture without undesired interference due to the excitation of index elements 11. As will be described below with respect to FIG. 4, and as is described in the above-mentioned copending applications, the light emitted by each index element 11 in response to the scanning thereof by the electron beam is sensed by a photo detector to produce a periodic signal, wherein each cycle is attributed to an excited index element.

Figure 2:
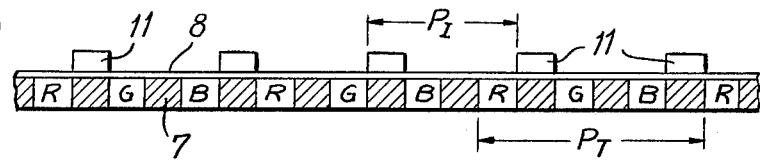
FIG. 2 is a representation of the top view of a portion of another display screen that scan be used in a beam index color televison receiver.
Figure 3:
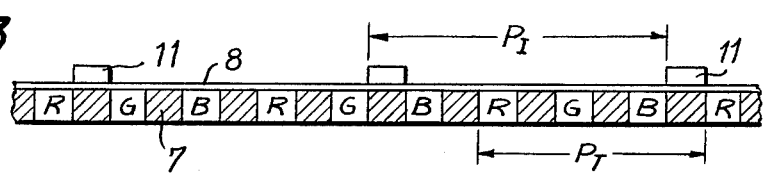
FIG. 3 is a representation of a top view of a portion of yet another display screen which can be used in a beam index color television receiver.

In FIG. 1, the pitch $P_I$ of the index elements is equal to the pitch $P_T$ of the triads of color elements. In FIG. 2, the ratio $(P_I/P_T)$ is equal to $\frac{2}{3}$. In FIG. 3, the ratio $(P_I/P_T)$ is equal to 4/3. In general, the ratio of the pitch $P_I$ of the index elements of the pitch $P_T$ of the triads of color elements can be expressed as $(3n\pm1)/3$, (wherein n is 0, 1, 2, . . .). As described in greater detail in, for example, copending Application Ser. No. 972,236, this ratio is preferred (although not required) because it minimizes faulty color synchronization in the index beam color television receiver caused by a phase shift in the index signal due to color modulation of the scanning beam.

The frequency of the index signal which is generated in response to the scanning of index elements 11 by the beam is determined by the spacing, or pitch of the index elements, and also by the horizontal scanning velocity of the beam. More specifically, the frequency of the index signals is inversely proportional to the pitch of the index elements and is directly proportional to the beam scanning velocity. Since the pitch of the index element is fixed, if the horizontal scanning velocity of the electron beam is constant, the frequency of the index signal also is constant. However, if the horizontal scanning velocity of the electron beam varies, due to, for example, non-linearity of the horizontal deflection circuit, the frequency of the index signal also varies.

Figure 4:
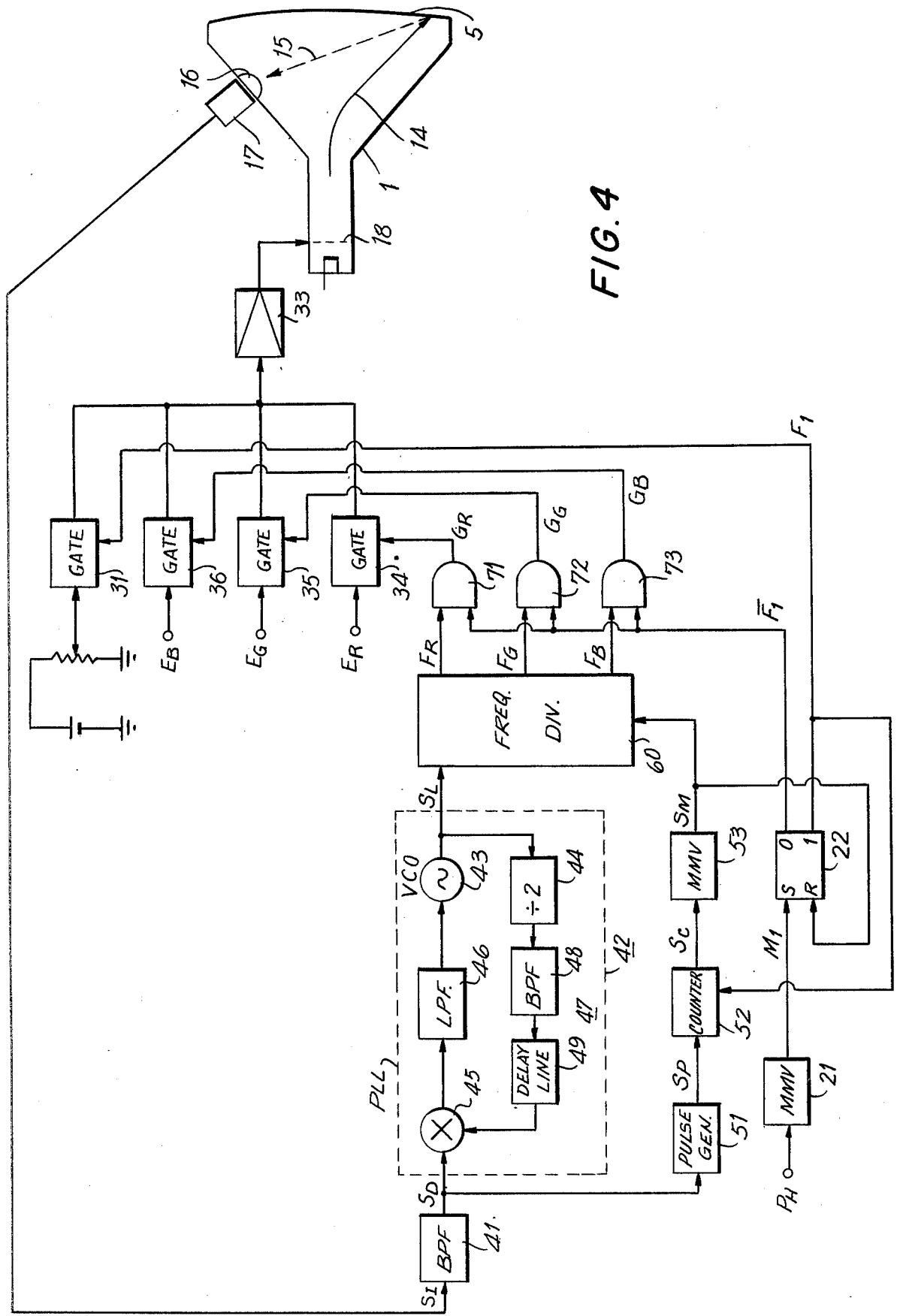
FIG. 4 is a block diagram of apparatus for controlling the electron beam in a beam index color television receiver in accordance with a preferred embodiment of the present invention.

Turning now to FIG. 4, there is illustrated one embodiment of color switching control circuitry for controlling the modulation of the electron beam in a beam index color television receiver. The color television receiver includes a cathode ray tube 1 having a beam source which, preferably, is a single beam color cathode ray tube. Cathode ray tube 1 is represented in a top view thereof, and is provided with a display screen 5 of the type shown more particularly in FIG. 6. This display screen includes a so-called lead-in portion 9 and a viewable portion 6. Lead-in portion 9 is scanned by electron beam 14 (FIG. 4) at the commencement of each horizontal scan thereof. Viewable portion 6 is provided with the RGB triads formed of, for example, vertically disposed color phosphor elements. Adjacent color elements are separated by a black material 7, such as carbon or the like. It is seen that the lead-in portion, a layer of black material 7 extends throughout. That is, the color phosphor elements are not provided in the lead-in portion. As is also shown in FIG. 6, metal layer 8 overlies the layer of black material 7 and the color phosphor elements. That is, black material 7 and the color phosphor elements are provided on one surface of metal layer 8. On the other surface of this metal layer is provided index elements 11 which, preferably, assume the arrangement shown in FIG. 2. That is, the pitch $P_I$ of index elements 11 is two-thirds the pitch $P_T$ of the triads of color elements.

Display screen 5 is provided in cathode ray tube 1 such that index elements 11 face the beam source, and the color elements are disposed in facing relation to a viewer. Thus, beam 14 impinges upon index elements 11 first, then passes through metal layer 8 to excite the color phosphor elements as the beam scans successive horizontal lines. As also shown in FIGS. 1–3 and in FIG. 6, index elements 11 are in alignment with the black material 7 which separates adjacent color elements.

As shown in FIG. 4, an optical lens 16 is provided in the cone-shaped, or funnel portion of the envelope of cathode ray tube 1. Lens 16 is adapted to receive light 15 which is emitted by each index element 11 when the latter is excited by the scanning beam 14. Thus, optical lens 16 receives light pulses which are produced at an index frequency determined by the horizontal scanning velocity of beam 14 and the pitch of index elements 11. Lens 16 is juxtaposed a photo detector 17 which, in turn, generates electrical signals corresponding to the light pulses that are received by the lens.

Cathode ray tube 1 includes a first grid 18 which is adapted to be supplied with color control, or information, signals for the purpose of modulating the electron beam which passes through this grid. More particularly, grid 18 serves to modulate the density of electron beam 14 in accordance with the color control, or information, signals supplied thereto.

The apparatus which is used to supply the color control, or information, signals to grid 18 now will be described. It will be assumed that the color television receiver in which the illustrated apparatus is used includes conventional circuitry so as to derive red, green and blue color control, or information, signals $E_R$, $E_G$ and $E_B$, respectively, from a received composite color television signal. It also is assumed that conventional beam deflection apparatus is provided in order to deflect electron beam 14 to scan a conventional raster across display screen 5.

The control apparatus is comprised of phase-locked loop 42, a frequency divider 60, color gate circuits 34, 35 and 36, and a lead-in inhibit circuit comprised of a flip-flop circuit 22, a counter 52 and AND gates 71, 72 and 73. Phase-locked loop 42 is adapted to synchronize the frequency and phase of an oscillating signal $S_L$ to that of the index signal $S_I$ which is produced by photo detector 17 in response to light focused thereon by optical lens 16 in response to the excitation of each index element 11 that is scanned by beam 14. Phase-locked loop 42 includes a controllable oscillator, such as a voltage-controlled oscillator (VCO) 43, a phase comparator 45 and low-pass filter 46. VCO 43 is adapted to generate oscillating signal $S_L$ of a frequency which is twice the frequency of index signal $S_I$. Accordingly, for proper phase comparison in phase comparator 45, the oscillating signal generated by VCO 43 must have its frequency divided so as to be equal to the frequency of index signal $S_I$. To this effect, a frequency divider 44 is connected to the output of VCO 43 to divide the frequency of the oscillating signal by a factor of two. The frequency-divided oscillating signal is coupled to one input of phase comparator 45 by a delay circuit 47, to be described. Another input of phase comparator 45 is connected to receive the index signal which is supplied thereto via a band pass filter 41. Thus, the phase of the frequency-divided oscillating signal derived from VCO 43 is compared to the phase of the filtered index signal $S_D$. Any phase differential therebetween results in an error signal produced by phase comparator 45, which error signal is supplied through low pass filter 46 to vary the frequency of the oscillating signal generated by VCO 43. That is, and as is conventional, VCO 43 is controlled by a phase differential error signal produced by phase comparator 45.

Oscillating signal $S_L$, which is phase-locked to the filtered index signal $S_D$, is of a frequency that is twice the frequency of the index signal, is coupled to frequency divider 60. This frequency divider is described in greater detail hereinbelow with respect to FIG. 6. For the purpose of the present discussion, it is sufficient to state merely that frequency divider 60 generates successive gating signals $F_R$, $F_G$ and $F_B$, each gating signal being phase-shifted by 120°, and the frequency of each gating signal being one-third the frequency of oscillating signal $S_L$. Thus, since the frequency of oscillating signal $S_L$ is twice the frequency of index signal $S_I$, the frequency of each gating signal is two-thirds the frequency of the index signal.

Gating signals $F_R$, $F_G$ and $F_B$ are supplied to gate circuits 34, 35 and 36, respectively, via AND gates 71, 72 and 73, the latter being included in the inhibit control circuit. Each of gate circuits 34, 35 and 36 may comprise an analog gating device which is conditioned to gate, or transmit, analog signals that are supplied thereto when a gating signal is applied in coincidence with the analog signal. Gate circuits 34, 35 and 36 are connected to receive the color control, or information signals $E_R$, $E_G$ and $E_B$, respectively, which are derived from conventional demodulating circuitry (not shown) normally provided in a color television receiver. Thus, when gate circuit 34 is enabled by a gating signal $F_R$, which is supplied thereto via AND gate 71 as gating signal $G_R$, this gate circuit is opened so as to transmit the red color control, or information, signal $E_R$. Similarly, when gate circuit 35 is enabled by gating signal $F_G$, which is supplied thereto via AND gate 72 as gating signal $G_G$, this gate circuit is opened to transmit the green color control, or information, signal $E_G$. Finally, when gate circuit 36 is enabled by gating signal $F_B$, supplied thereto via AND gate 73 as gating signal $G_B$, gate circuit 36 opens to transmit the blue color control, or information, signal $E_B$, The outputs of gate circuits 34, 35 and 36 are connected in common to an amplifier 33 which, in turn, supplies the gated color control, or information, signal to grid 18.

The inhibit control circuit is adapted to inhibit gate circuits 34, 35 and 36 from opening during the lead-in movement of beam 14. That is, and with reference to FIG. 6, when beam 14 commences its scan of a horizontal line, it traverses lead-in portion 9 before reaching viewable portion 6. The gate circuits are inhibited from opening while the beam traverses this lead-in portion. To this effect, the inhibit control circuit includes flip-flop circuit 22, counter 52 and aforementioned AND gates 71, 72 and 73. Flip-flop circuit 22 is a so-called set/reset type having a set input S adapted to receive a pulse signal when beam 14 commences its scanning of a horizontal line. A suitable pulse signal is generated by a monostable multivibrator 21 whose input is connected to receive the usual horizontal synchronizing signal $P_H$ which normally is included in a composite color television signal and which is separated therefrom by conventional synchronizing detector circuitry. Flip-flop circuit 22 additionally includes 1 and 0 outputs. When a pulse is applied to its set input S, flip-flop circuit 22 assumes its set state to produce a binary "1" at its 1 output. This binary "1" is supplied as a signal $S_1$ to a gate circuit 31, to be described. When the flip-flop circuit is reset, as when a signal is supplied to its reset input R (to be described), a binary "1" is produced at its 0 output, this binary "1" being supplied as a signal $\overline{F}_1$ to each AND gate 71, 72 and 73.

Counter 52 is adapted to count each cycle of filtered index signal $S_D$. The input of counter 52 is connected to a pulse generator 51 which is adapted to generate a pulse in response to, for example, each negative-going zero crossing of filtered index signal $S_D$. Thus, pulse generator 51 may comprise a conventional zero cross detector (ZCD) to generate a pulse $S_P$ at each cycle of the filtered index signal. These pulses $S_P$ are counted by counter 52 until a predetermined count is attained. When this counter attains its predetermined count, an output pulse $S_C$ is generated, this output pulse being supplied to monostable multivibrator 53 to trigger the same. When triggered, monostable multivibrator 53 generates a pulse $S_M$ of predetermined duration, as distinguished from generating merely a trigger pulse. Pulse $S_M$ is supplied to frequency divider 60 to preset the frequency divider to a desired condition, and this pulse also is supplied to the reset input R of flip-flop circuit 22.

Counter 52 additionally includes an enable input connected to the 1 output of flip-flop circuit 22. That is, when the flip-flop circuit is in its set state, as when triggered thereto in response to a horizontal synchronizing pulse $P_H$, counter 52 is enabled to count the pulses $S_P$ derived from index signal $S_I$. When flip-flop circuit 22 is reset, as when counter 52 attains its predetermined count, the enable signal which had been applied to the enable input of this counter is terminated, thus inhibiting the counter from being incremented in response to further pulses $S_P$ and, moreover, resetting the counter to a predetermined, or initial count.

Gate circuit 31 includes an input connected to receive a bias voltage derived from variable resistor 32. This gate circuit is enabled by signal $S_1$, that is, when flip-flop circuit 22 is set, so as to transmit the bias voltage to amplifier 33, whereupon the bias voltage is applied to grid 18. As will be explained below, gate circuit 31 is opened when beam 14 traverses the lead-in portion of display screen 5 so as to modulate beam 14 to have a predetermined intensity.

Figure 5:
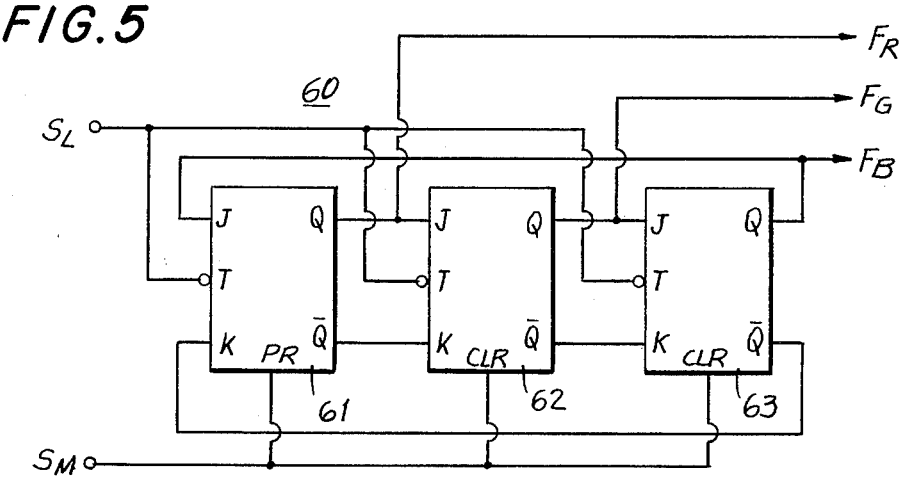
FIG. 5 is a logic diagram of a portion of the apparatus shown in FIG. 4.

Before describing the operation of the apparatus illustrated in FIG. 4, reference is made to FIG. 5 which is a logic diagram showing a preferred embodiment of frequency divider 60. The frequency divider is a ring-counter comprised of three stages, each being constituted by a J-K flip-flop circuit 61, 62 and 63, respectively. As is conventional, each J-K flip-flop circuit also includes a timing input T, whereupon the state of the flip-flop circuit is changed over in response to a negative transition supplied to the timing input so as to assume a state determined by the binary signals which then are received at the J and K inputs. If a binary "1" is received at the J input while, concurrently, a binary "0" is received at the K input, the J-K flip-flop circuit responds to a negative transition supplied to the timing input T so as to assume its set state, whereupon a binary "1" is produced at the Q output thereof and a binary "0" is produced at the $\overline{Q}$ output thereof. Conversely, if a binary "0" is received at the J input while, concurrently, a binary "1" is received at the K input, the J-K flip-flop circuit will be reset in response to a negative transition supplied to the timing input T, whereupon a binary "0" is produced at the Q output and a binary "1" is produced at the $\overline{Q}$ output. If a binary "1" is received concurrently at both the J and K inputs, the J-K flip-flop circuit will be changed over from its set to its reset state, or from its reset to its set state, in response to a negative transition supplied to the timing input T. Finally, if a binary "0" is received concurrently at both the J and K inputs, the state of the J-K flip-flop circuit will not be changed in response to the next negative transition supplied to the timing input T. As is also conventional, the J-K flip-flop circuit can be either preset to its set state or cleared to its reset state when a pulse is supplied to its preset input (PR) or to its clear input (CLR), respectively.

In the ring counter shown in FIG. 5, flip-flop circuit 61 is preset to its set state while flip-flop circuits 62 and 63 are preset to their reset states, respectively, in response to a pulse signal supplied to the preset input PR of flip-flop circuit 61 and a pulse input supplied to the clear input CLR of each of flip-flop circuits 62 and 63. Then, when a negative transition is supplied periodically to the timing input T of each flip-flop circuit, the set condition of flip-flop circuit 61 is shifted, sequentially, to flip-flop circuit 62, then to flip-flop circuit 63 and back to flip-flop circuit 61, and so on. Thus, the binary "1" which, initially, is preset at the Q output of flip-flop circuit 61, is shifted, sequentially, to the Q output of flip-flop circuit 62, then to the Q output of flip-flop circuit 63, then to the Q output of flip-flop circuit 61, and so on, continuing in this ring advancement. The Q outputs of flip-flop circuits 61, 62 and 63 provide the gating signals $F_R$, $F_G$ and $F_B$, respectively. Thus, as the ring counter advances, a binary "1" gating signal is shifted, sequentially, so as to be present, initially, as gating signal $F_R$, then as gating signal $F_G$, then as gating signal $F_B$, then as gating signal $F_R$, and so on.

The manner in which the control apparatus illustrated in FIG. 4 operates now will be described, with particular reference to the waveform diagrams illustrated in FIGS. 6A–6P. These waveform diagrams are juxtposed the representation of display screen 5, and particularly the triads of color phosphor elements and vertical stripes of index elements 11. This facilitates a ready understanding of the waveforms which are produced when electron beam 14 scans lead-in portion 9 and then viewable portion 6. As electron beam 14 scans a horizontal line across display screen 5, each index element 11 is excited by the beam to emit light. This light is focused by lens 16 onto photo detector 17 which, in turn, generates index signal $S_I$ as shown in FIG. 6A. The frequency of this index signal is, of course, inversely proportional to the pitch of index element 11 and directly proportional to the horizontal scanning velocity of beam 14. The amplitude of the index signal is a function of the light emitted by each excited index element which, in turn, is determined by the intensity, or beam density, of electron beam 14. As will be explained below, when the beam scans lead-in portion 9, the density thereof is constant. However, when the beam scans viewable portion 6, the density thereof is determined by the color control, or information, signals which are supplied to grid 18 and which modulate the density of the beam.

Index signal $S_I$ is supplied to phase-locked loop 42 by band pass filter 41. The filtered index signal $S_D$ is shown in FIG. 6B as a sinusoidal signal of substantially constant amplitude. Of course, as is conventional, band pass filter 41 exhibits an inherent time delay whereby the filtered index signal is slightly time-displaced from index signal $S_I$. In the interest of simplification, FIGS. 6A and 6B do not illustrate this small time displacement. The phase-locked loop synchronizes oscillating signal $S_L$, produced by VCO 43, to filtered index signal $S_D$. As mentioned above, it is preferred, although not required, that oscillating signal $S_L$ have a frequency that is twice the frequency of the index signal. FIG. 6D illustrates this oscillating signal. It is appreciated that phase-locked loop 42 exhibits an inherent time delay, as is typical of most phase-locked loops. Delay circuit 47, which functions as a time adjustment circuit, is connected between the output of VCO 43 and the input of phase comparator 45 so as to feed back a delayed frequency-divided oscillating signal to the phase comparator for phase comparison with filtered index signal $S_D$. The overall time delay of this delay circuit is substantially equal to the aforementioned inherent static time delay of the illustrated apparatus, that is, this time delay is substantially equal to the sum of the time delays of band pass filter 41, phase-locked loop 42, frequency divider 60, AND gates 71, 72 and 73, and gate circuits 34, 35 and 36. Preferably, delay circuit 47 is comprised of band pass filter 48 connected in cascade with delay line 49. If the characteristics of band pass filter 48 are equal to the characteristics of band pass filter 41, including the inherent time constant thereof, then delay line 49 exhibits a time delay equal to the difference between the static time delay of the illustrated apparatus and the time delay of band pass filter 41. By delaying the frequency-divided oscillating signal which is fed back to phase comparator 45, it is appreciated that, when VCO 43 is synchronized with filterd index signal $S_D$, oscillating signal $S_L$ is time-advanced so as to account for, or compensate, the remaining static time delay of frequency divider 60, AND gates 71-73 and gate circuits 34-36.

Let it be assumed that electron beam 14 commences its scan of a horizontal line. The beginning of such a scan is established by the receipt of a horizontal synchronizing pulse $P_H$, shown in FIG. 6J. The positive transition of the horizontal synchronizing pulse triggers monostable multivibrator 21 to its quasi-stable state, resulting in pulse $M_1$, shown in FIG. 6K. When this pulse terminates, the negative transition thereof sets flip-flop circuit 22 to its set state, whereupon the 1 output thereof produces a binary "1" for signal $\overline{F_1}$ (FIG. 6L) and a binary "0" at the 0 output thereof for complementary signal $F_1$ (FIG. 6M). Since signal $F_1$ is a binary "1" it enables gate circuit 31. Consequently, the bias signal supplied to this gate circuit by adjustable resistor 32 is transmitted to amplifier 33 and to grid 18 so as to establish a predetermined beam density for electron beam 14 during the scan thereof through lead-in portion 9 of display screen 5. Hence, index signal $S_I$ (FIG. 6A) exhibits a constant amplitude, as shown.

The binary "1" of signal $F_1$ also is supplied as an enabling signal to counter 52. This counter also is supplied with index pulses $S_P$ which are produced by pulse generator 51 in response to the filtered index signal $S_D$ which is supplied thereto. These index pulses are illustrated in FIG. 6C and, as mentioned previously, pulse generator 51 may comprise a zero cross detector.

In the construction of display screen 5, a predetermined number of index elements 11 is provided in lead-in portion 9. As an example thereof, eight index elements are disposed in this lead-in portion. Index pulses $S_P$, which are generated while beam 14 scans lead-in portion 9, are counted by counter 52. When the predetermined number of index pulses $S_P$ is counted, that is, when counter 52 attains a count of eight, an output pulse $S_C$ (FIG. 6E) is produced. The positive transition of pulse $S_C$ triggers monostable multivibrator 53 to produce pulse $S_M$ (FIG. 6F). This pulse $S_M$ is supplied to the reset input R of flip-flop circuit 22, and the negative transition of this pulse resets the flip-flop circuit such that signal $F_1$ undergoes a transition from binary "1" to binary "0", and complementary signal $\overline{F_1}$ undergoes a transition from binary "0" to a binary "1", as shown in FIGS. 6L and 6M, respectively. When flip-flop circuit 22 is reset, counter 52 now is disabled and also may be reset to its initial count, such as a count of zero.

Pulse $S_M$ also is supplied to the preset input PR of J-K flip-flop circuit 61 and to the clear inputs CLR of J-K flip-flop circuits 62 and 63, all included in frequency divider 60, as shown in FIG. 5. As represented in FIG. 6F, pulse $S_M$ is not a trigger pulse but, rather, is of sufficient duration so as to preset flip-flop circuit 61 to its set state and to clear flip-flop circuits 62 and 63 to their reset states. Thus, it is seen that, when counter 52 attains its predetermined count, that is, after a predetermined number of cycles of the index signal have been counted, gating signal $F_R$ (i.e., the red gating signal) is produced, as shown in FIG. 6G. This gating signal is produced at the time that beam 14 is in proper scanning alignment with the first red phosphor element in viewable portion 6 of display screen 5. It also is seen that pulse $S_M$ coincides with a negative transition of oscillating signal $S_L$. This is to prevent such negative transition from advancing the ring counter formed of flip-flop circuits 61-63 until the next-following negative transition, that is, the gating signal produced by frequency divider 60 is not shifted until beam 14 has completed its scan of the red phosphor element.

Following the termination of pulse $S_M$, each successive negative transition of oscillating signal $S_L$ (FIG. 6D) advances the ring counter which comprises frequency divider 60, whereupon the gating signals produced thereby are advanced as shown in FIGS. 6G, 6H and 6I. Hence, the red, green and blue gating signals $F_R$, $F_G$ and $F_B$ are cyclically produced, in sequence.

During the period that beam 14 scans lead-in portion 9 of display screen 5, flip-flop circuit 22 had been set. As a result of this set state of the flip-flop circuit, signal $\overline{F}_1$ had been a binary "0" so as to disable AND gates 71, 72 and 73. Consequently, even though the color gating signals $F_R$, $F_G$ and $F_B$ had been produced by frequency divider 60 during this lead-in portion, these color gating signals were inhibited from being gated to gate circuits 34, 35 and 36. Therefore during the lead-in portion of the horizontal scan of beam 14, the beam density is not modulated with color control, or information signals. Now, however, that beam 14 has reached the beginning of viewable portion 6, the flip-flop circuit 22 is reset so that signal $\overline{F}_1$ now is a binary "1". This, in turn, conditions AND gates 71, 72 and 73 to gate the red, green and blue gating signals $F_R$, $F_G$ and $F_B$ to gate circuits 34, 35 and 36, respectively, as gate signals $G_R$, $G_G$ and $G_B$, as shown in FIGS. 6N, 6O and 6P, respectively. Accordingly, as beam 14 continues to scan viewable portion 6, each of gate circuits 34, 35 and 36 is enabled, in sequence, and cyclically, so as to transmit the red, green and blue control, or information, signals to grid 18. This, in turn, switches the beam density of electron beam 14 as a function of the respective color control, or information, signal in synchronism with the scanning of the beam across red, green and blue phosphor elements.

When beam 14 completes one horizontal scan and commences the next horizontal scan, the aforedescribed operation is repeated. Thus, as the beam scans each horizontal line, index signals $S_I$ are generated, and the color control, or information, signals are switched in synchronism with such index signals so as to modulate the density of the beam. It is appreciated that, when beam 14 scans a red phosphor element on display screen 5, the red control, or information, signal is gated so as to modulate the density of the beam. Then, when the beam moves into proper scanning alignment with the next adjacent phosphor element, which is assumed herein to be the green phosphor element, the green control, or information, signal is gated so as to correspondingly modulate the density of the beam. Similarly, when the beam then moves into proper scanning alignment with the adjacent blue phosphor element, the blue control, or information, signal is gated so as to correspondingly modulate the density of the beam. Hence, color switching, or modulation, of electron beam 14 is done in synchronism wth the movement of that beam, as derived from index signals $S_I$.

Since phase-locked loop 42 is used to drive frequency divider 60 in synchronism with index signal $S_I$, and since the frequency of the index signal is responsive to variations in the horizontal scanning velocity of beam 14, it is appreciated that the frequency and times of occurrence of the red, green and blue gating signals $F_R$, $F_G$ and $F_B$ also are synchronized with the beam scanning velocity. Consequently, any changes in the scanning velocity are taken into account such that the red, green and blue gate circuits 34, 35 and 36 are opened only when the beam is in proper scanning alignment with the red, green and blue phosphor elements, respectively. Furthermore, the inherent static time delay of the overall control apparatus, that is, the static time delay of the "loop" formed of photo detector 17, band pass filter 41, phase-locked loop 42, frequency divider 60, AND gates 71-73 and gate circuits 34-36, is compensated by delay circuit 47 included in the phase-locked loop. This has the desired effect of opening a respective color gate circuit only at the time that beam 14 is in proper scanning alignment with a corresponding color phosphor element. In the absence of this delay circuit to compensate for the inherent static time delay of the illustrated loop, beam 14 might have advanced beyond its proper scanning alignment with a color element at the time that the associated color gate is opened. It is a desirable aspect of the present invention to avoid this difficulty.

While the present invention has been particularly shown and described with reference to a preferred embodiment thereof, it should be readily apparent to those of ordinary skill in the art that various changes and modifications in form and details may be made without departing from the spirit and scope of the invention. For example, in detecting the end of lead-in portion 9, it is assumed that counter 22 counts a predetermined number (for example, eight) of cycles of the index signal ($S_I$). As an alternative, the end of lead-in portion 9 can be represented by a relatively large gap between the last index element 11 in the lead-in portion and the first index element in the viewable portion. When this large gap is detected, pulse $S_M$ can be produced, thus obviating the necessity of counter 52, such as described in copending application Ser. No. 972,236. Also, the ratio of the pitch $P_I$ of index elements 11 to the pitch $P_T$ of triads of RGB color elements can be 1:1, as well as the above-mentioned ratio of $(3N \pm 1)/3$. It is, therefore, intended that the appended claims be interpreted as including these as well as other similar changes and modifications.

What is claimed is:

1. Apparatus for controlling the electron beam in a beam index color television receiver of the type having a cathode ray tube whose display screen is provided with beam-excitable color elements and index elements which are scanned by said beam, said apparatus comprising index signal generating means for generating a periodic index signal as said index elements are scanned by said beam; color gate means for sequentially gating respective color control signals individually to modulate said electron beam as said beam scans said color elements; gating signal generating means for generating sequential gating signals at a frequency synchronized with the frequency of said periodic index signal, said gating signals being supplied in sequence to said color gate means to control the latter to gate said respective color control signals; and driving means responsive to said periodic index signal to drive said gating signal generating means, said driving means including time adjustment means for compensating the inherent time delay of at least said color gate means, said gating signal generating means and said driving means such that said respective color control signals are gated in time correspondence with the position of said beam at a color element that is associated with the gated color control signal.

2. The apparatus of claim 1 wherein said driving means comprises a phase-locked loop having a controllable oscillator for producing an oscillating signal, and a phase comparator for comparing said oscillating signal to said index signal and for adjusting the phase of said oscillating signal to be synchronized with said index signal; and said time adjustment means comprises time delay means connected between said controllable oscillator and said phase comparator.

3. The apparatus of claim 2 wherein said time delay means imparts a time delay to the oscillating signal supplied to said phase comparator which is substantially equal to said inherent time delay.

4. The apparatus of claim 3 further comprising filter means for applying said index signal to said phase comparator; and wherein said time delay means comprises additional filter means having a time constant that is substantially equal to the time constant of the first-mentioned filter means, and a delay circuit having a time delay substantially equal to the sum of the inherent time delays of said phase comparator, said controllable oscillator, said gating signal generating means and said color gate means.

5. The apparatus of claim 4 wherein said color gate means comprises red, green and blue gate means for gating red, green and blue control signals, respectively; and said gating signal generating means generates red, green and blue gating signals to control said red, green and blue gate means, respectively.

6. A beam index color television receiver including means responsive to a received color television signal for providing respective color control signals, said beam index color television receiver comprising:

a cathode ray tube having a display screen provided with sequentially repeating beam-excitable color elements and with periodic index elements, and also having a beam source for producing a scanning electron beam which scans said color elements and said index elements;

index signal generating means responsive to the scanning of said index elements by said beam for generating an index signal of a frequency that is a function of the scanning velocity of said beam;

color gate means supplied with said respective color control signals and responsive to sequential gating signals applied thereto for sequentially gating respective ones of said color control signals to modulate the density of said electron beam with the gated color control signals; and means responsive to said index signal to produce said sequential gating signals, each at a frequency synchronized with said index signal, the last-mentioned means including time compensating means for compensating the inherent time delays exhibited by said means to produce said sequential gating signals and by said color gate means such that each gating signal is applied to said color gate means in time correspondence with the scanning by said beam of an associated color element.

7. The invention of claim 6 wherein said means to produce said sequential gating signals comprises a phase-locked loop including a controllable oscillator for producing an oscillating signal synchronized with said index signal, frequency dividing means for dividing the frequency of said oscillating signal to produce said sequential gating signals, and time delay means included in said phase-locked loop and having a time delay equal at least to the sum of the inherent time delays of said phase-locked loop, said frequency dividing means and said color gate means.

8. The invention of claim 6 or 7 wherein said color elements are constituted by red, green and blue color elements; said color gate means comprise red, green and blue gate circuits; and said frequency dividing means divides the frequency of said oscillating signal by a factor to produce sequentially phaseshifted red, green and blue gating signals.

9. The invention of claim 8 wherein said periodic index elements are phosphor elements to emit light when scanned by said electron beam; and said index signal generating means comprises focusing means for focusing the light emitted by said phosphor inex elements and photosensing means for sensing the focused light to produce a corresponding index signal.

10. The invention of claim 9 wherein the display screen of said cathode ray tube has a viewable portion upon which said red, green and blue color elements together with said phosphor index elements are provided and a lead-in portion upon which a predetermined number of phosphor index elements is provided, said electron beam scanning said lead-in portion in advance of said viewable portion at each scan thereof; and further comprising means for inhibiting said red, green and blue gate circuits from gating respective ones of said color control signals during the scanning of said lead-in portion of said display screen.

11. The invention of claim 10 wherein said means for inhibiting comprises bistate means responsive to the commencement of each scan of said electron beam to be set to a first state to inhibit said red, green and blue gate circuits; and counting means for counting the cycles of said index signal from the commencement of a scan until said predetermined number of phosphor index elements has been scanned to reset said bistate means to a second state, whereby said red, green and blue gate circuits are enabled to gate respective ones of said color control signals.

* * * * *